April 28, 1942.  R. C. HUNTOON  2,280,953
EXHAUST STRUCTURE
Filed Oct. 12, 1940   2 Sheets-Sheet 1
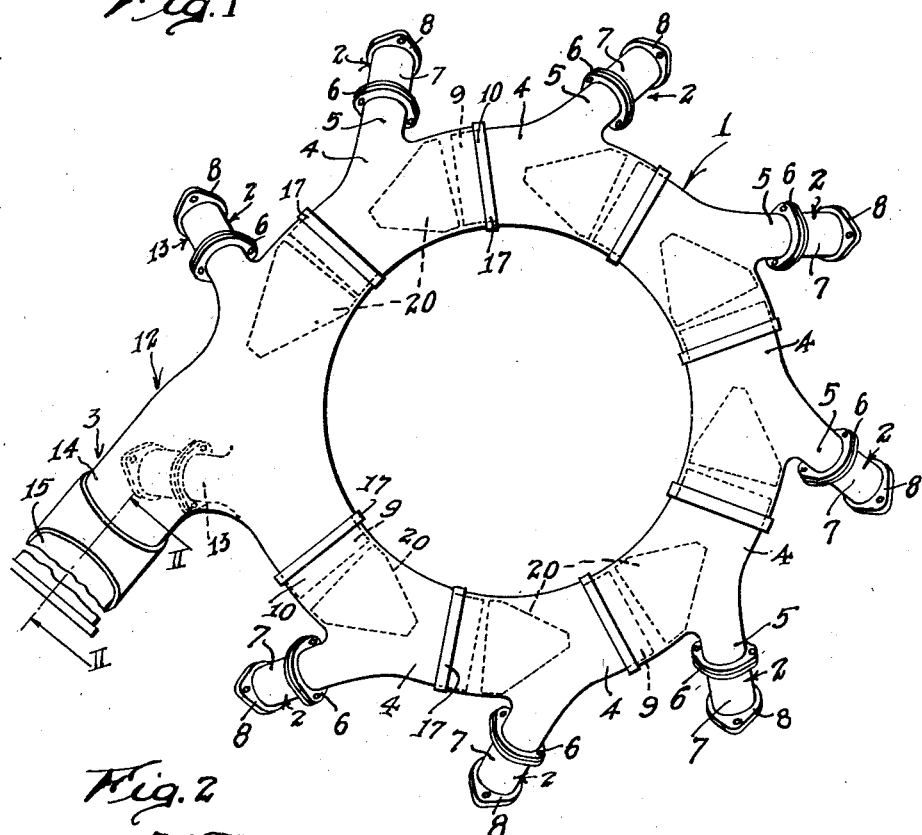
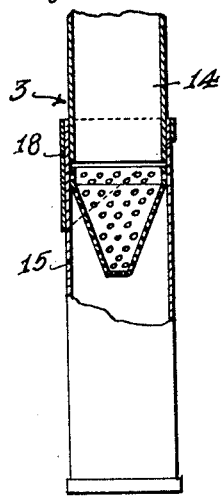
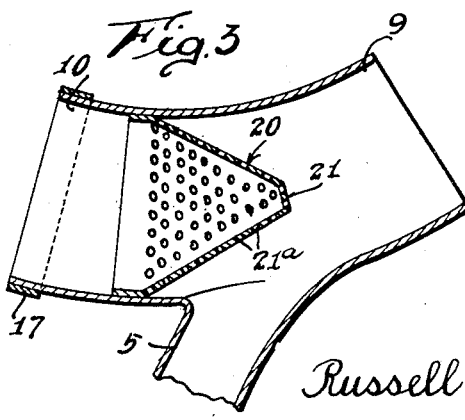
Inventor
Russell C. Huntoon
By Lyon & Lyon
Attorneys April 28, 1942.        R. C. HUNTOON        2,280,953
                        EXHAUST STRUCTURE
              Filed Oct. 12, 1940           2 Sheets-Sheet 2

Inventor
Russell C. Huntoon
By Lyon & Lyon
Attorneys

Patented Apr. 28, 1942

2,280,953

UNITED STATES PATENT OFFICE 2,280,953

EXHAUST STRUCTURE

Russell C. Huntoon, San Diego, Calif., assignor to Solar Aircraft Company, San Diego, Calif., a corporation of California Application October 12, 1940, Serial No. 360,865

5 Claims. (Cl. 181—40)

This invention relates to exhaust manifolds for internal combustion engines, and more particularly to exhaust structures for radial engines such as are commonly used in aircraft.

An object of the invention is to provide a simple and inexpensive exhaust manifold for radial engines, which manifold has superior muffling characteristics.

A feature of the invention is a closed annular exhaust manifold for a radial engine having muffling baffles positioned therein between points of discharge thereinto of exhaust gases from the engine cylinders.

Other more specific objects and features of the invention will become apparent from the detailed description to follow of a particular embodiment of the invention shown in the drawings.

In the drawings:

Fig. 1 is a front elevational view of a manifold structure in accordance with the invention;

Fig. 2 is a detailed section, taken along the line II—II of Fig. 1;

Fig. 3 is a detailed section taken through one of the muffling elements of the manifold and adjacent lead-in duct;

Figure 4:
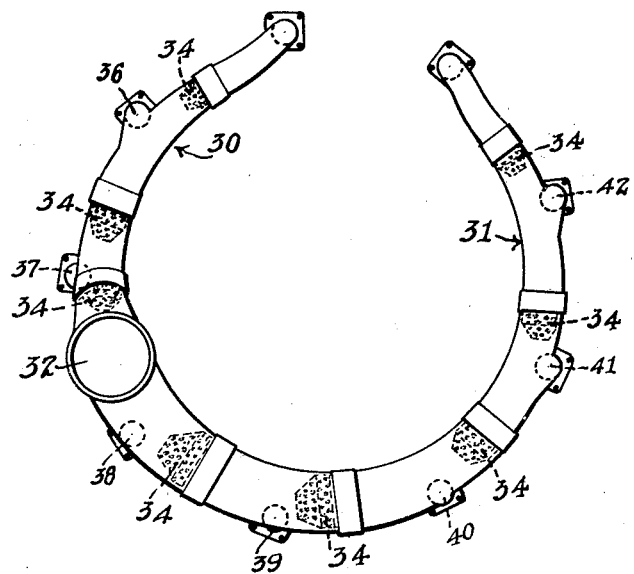
Fig. 4 is a rear elevation view of an alternative manifold construction in accordance with the invention.

Referring to Fig. 1, there is disclosed an annular exhaust manifold 1 adapted to be positioned in front of or back of a radial engine and having a plurality of branch pipes 2 uniformly spaced circumferentially about the annular manifold 1. In addition to the inlet pipes 2, which are connected to the discharge ports of the different cylinders of a radial engine (not shown), there is connected to the annular manifold 1 a discharge pipe 3, which may connect to a tailpipe or to a separate muffler, as desired.

The manifold includes a plurality of similar sections 4, each section including an arcuate portion of the annular manifold 1 and an integral branch duct 5. The branch ducts 5 are in turn secured by flanged connectors 6 to inlet pipes 7 which, in turn, are adapted to be secured at their inner ends as by flange members 8 to different cylinders of a radial engine so that the assembly as a whole may be supported from the cylinders of the engine with which it works. Each section 4 is connected to the adjacent sections by slip connections. Thus, as shown in Fig. 1, each section 4 has a male end 9 adapted to slip into and slidably engage a female end 10 on the next section thereto in counterclockwise direction, which is the direction of flow of exhaust gases in the annular manifold. In order to produce the flow in counterclockwise direction in the annular manifold, the branch pipes 5 are inclined, as shown in Fig. 1, so that the exhaust gases entering the annular manifold through each branch pipe 5 have a circumferential component in a counterclockwise direction.

Because of the discharge branch 3, the manifold cannot be completely composed of the similar sections 4 and a special section 12 must be provided, which section has formed integrally therewith two branch sections 13 for conducting exhaust gases into the manifold from two engine cylinders, and also including a large exhaust branch 14 which slips into a discharge pipe section 15.

The female end of each section 4 and the section 12 is preferably reinforced with a band 17 welded thereto. Likewise the discharge pipe 15 may be reinforced at its upper end with a collar 18.

It will be observed that the discharge branch 14 is inclined oppositely to the inlet branches 5 so as to facilitate the discharge of a portion of the circulating exhaust gases in the annular portion of the manifold without abrupt change in direction of flow of those gases.

The structure so far described is old in the art, and, per se, does not constitute invention. The present invention resides in the combination in a manifold as described, of baffles for reducing the noise of the exhaust. These baffles consist of perforated frusto-conical members 20, one inserted adjacent the inlet end of each of the sections 4 and 12, with an additional one near the inlet end of the discharge section 15. As shown in the drawings, the baffle members 20 of the manifold sections 4, together with the baffle member in the annular portion of the manifold section 12, form barriers between all of the inlet pipes 5 and the tailpipe 15, but the two branch pipes 13 connected to the manifold section 12 can discharge directly into the discharge section 14. It is to provide a baffling effect on the gases discharged from the branch pipes 13 that the baffle section 20 is provided in the discharge pipe 15. It is well known that in a closed annular manifold of the type disclosed, in which there is provided a continuous annular path, some of the gases circulate through the annular passage one or more times before being discharged into the tailpipe 15. This results from the fact that the inclination of the inlet pipes 5 and 13 causes the gases to circulate at relatively high velocity through the closed annular path of the manifold.

The provision of the baffle members 20 within the annular portion of the manifold, tends to reduce the velocity of circulation of the gases, and to increase the turbulence of gas flow. This increased turbulence of the hot exhaust gases causes a greater heat transfer from the gases to the manifold with a consequent greater cooling and reduction in volume of the gases. Since the total volume of exhaust gases is less, the final gas velocity at the point of discharge is less, thereby reducing the noise effect when discharged into the atmosphere.

Furthermore, the velocity of the gas through the open ends 21 of the conical baffles 20 is relatively great and as a result of its Venturi effect produces an area of lower pressure immediately adjacent to the openings 21ª and extending into the paths of the gases being exhausted from the branch passages 5 into the annular portion of the manifold, thereby aiding the gases to escape from the combustion chamber of the engine and increasing the power of the engine.

As a result gases being exhausted through the manifold are reduced in velocity, high pressure explosions are throttled and damped, tending to produce an even, quiet flow from the manifold, and a more efficient scavenging of the engine cylinders.

Figure 5:
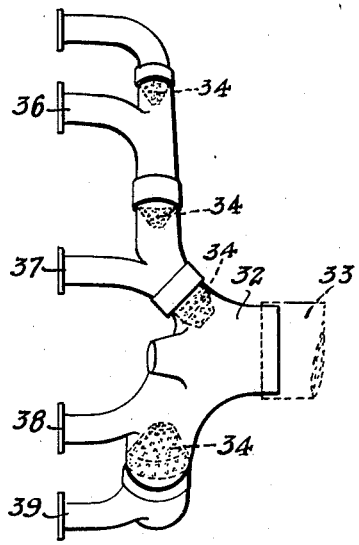
Fig. 5 is a side elevation view of the construction shown in Fig. 4.

Although the invention is particularly useful in connection with annular manifolds of the type shown in Fig. 1, it is also useful in non-annular manifolds, one example of which is illustrated in Figs. 4 and 5.

Thus, although the manifold of Figs. 4 and 5 is designed for use on a radial engine, it does not form a closed path, but, instead has two branches 30 and 31, respectively, which merge together at a point of common discharge through a port 32 which may be connected to a tailpipe 33. With this construction the manifold becomes progressively larger in cross-sectional area from each end toward the discharge port 32. The manifold as shown is constructed of sections connected together in the same general manner as are the sections of the manifold shown in Fig. 1, and contains conical perforated baffles 34 identical with those illustrated in Figs. 1 and 3.

Of course in a non-annular manifold, as shown in Figs. 4 and 5, there can be no circular flow of the gases in a common direction around through the manifold before their discharge. Instead, the gases flow in opposite directions from the opposite ends of the manifold towards the common discharge port 32. However, the construction of Figs. 4 and 5 is useful in that the baffles 34 throttle and damp the explosion in the gas and produce a Venturi effect, reducing the pressure of the gases adjacent some of the branch pipes 36, 37, 38, 39, 40, 41, and 42, respectively.

Although the invention has been explained by describing in detail two particular embodiments thereof, it is to be understood that these embodiments are merely illustrative, and that departures from the specific structures shown can be made without departing from the invention, which is to be limited only as set forth in the appended claims.

I claim:

1. In a manifold construction for a radial internal combustion engine, means defining a continuous annular passage, inlet ducts extending from said means defining said annular passage for conveying exhaust gases from different engine cylinders into said annular passage, said inlet ducts being inclined circumferentially, whereby gases are discharged therefrom into said annular passage with a tangential component, discharge means connected to said annular passage for conveying gases therefrom, and a plurality of baffle members mounted in said annular passage for retarding circulation of gases therethrough.

2. An exhaust manifold structure as described in claim 1, in which at least through the major portion of said annular passage one of said baffles is interposed between each successive pair of inlet ducts.

3. An exhaust manifold structure as described in claim 1, including a baffle member in said discharge duct for conveying gases away from said annular passage.

4. In a manifold construction for a multi-cylinder internal combustion engine, casing means defining a common passage for exhaust gases from a plurality of said cylinders, branch pipes extending from said cylinders into said casing at longitudinally spaced points therealong, and baffle means positioned in and secured directly to said casing intermediate points of entry of a pair of branch pipes into said casing, said casing means being of substantially circular cross section and said baffle means comprising a sheet member in the shape of a surface of revolution, the axis of which is concentrically disposed within the casing.

5. A manifold construction as described in claim 4, in which said baffle is frusto-conical in shape with its apex extending in the direction of gas flow through said casing and approximately juxtaposed to a point of entry of gases from one of said branch pipes into said casing.

RUSSELL C. HUNTOON.